United States Patent
Kanemoto et al.

(10) Patent No.: US 8,638,943 B2
(45) Date of Patent: Jan. 28, 2014

(54) COMMUNICATION DEVICE, COMMUNICATION METHOD, COMMUNICATION SYSTEM AND SERVICE ISSUING METHOD

(75) Inventors: Toshinori Kanemoto, Kanagawa (JP); Teiichi Shiga, Chiba (JP)

(73) Assignee: Sony Corporation, Tokyo (JP)

( * ) Notice: Subject to any disclaimer, the term of this patent is extended or adjusted under 35 U.S.C. 154(b) by 302 days.

(21) Appl. No.: 12/431,942

(22) Filed: Apr. 29, 2009

(65) Prior Publication Data
US 2009/0286483 A1 Nov. 19, 2009

(30) Foreign Application Priority Data

May 13, 2008 (JP) .................... 2008-126152

(51) Int. Cl.
*H04L 9/14* (2006.01)
*H04L 9/32* (2006.01)

(52) U.S. Cl.
USPC ............................ 380/281; 713/168; 713/193

(58) Field of Classification Search
USPC ........ 455/66.1; 705/51, 52, 53; 713/168, 189, 713/193; 726/26, 27, 28; 380/278, 281, 282
See application file for complete search history.

(56) References Cited

U.S. PATENT DOCUMENTS 7,184,986 B2 * 2/2007 Ishibashi et al. ................ 705/52
2003/0023847 A1 * 1/2003 Ishibashi et al. .............. 713/169

FOREIGN PATENT DOCUMENTS

| JP | 2004-334746 | 11/2004 |
| JP | 2005-134953 | 5/2005 |
| JP | 2007-317093 | 12/2007 |
| JP | 2008-084335 | 4/2008 |

OTHER PUBLICATIONS

Japanese Office Action for corresponding JP2008-126152 issued on Mar. 30, 2010.

* cited by examiner

*Primary Examiner* — Dean O Takaoka
(74) *Attorney, Agent, or Firm* — K&L Gates LLP

(57) ABSTRACT

A communication device includes an antenna for transmitting and receiving signals with a reader/writer of a service issuing terminal; a recording unit recorded with data, and also recorded with a pattern in which information specifying an authentication key and access attribute indicating whether or not a readout process or a write process on the data is possible using the authentication key are corresponded; and a control unit for, when receiving one or plural information specifying a region of the data from the reader/writer of the service issuing terminal via the antenna, holding the received one or plural information specifying the region of the data.

8 Claims, 12 Drawing Sheets

FIG.2A

AUTHENTICATION REQUEST (Auth1_Req)

| REQUEST IDENTIFIER | DEVICE IDENTIFIER (IDm) | SERVICE CODE (SID) | AUTHENTICATION CHALLENGE MESSAGE M1c |
|---|---|---|---|

FIG.2B

AUTHENTICATION RESPONSE (Auth1_Res)

| RESPONSE IDENTIFIER | DEVICE IDENTIFIER (IDm) | AUTHENTICATION CHALLENGE MESSAGE M2c | AUTHENTICATION CHALLENGE MESSAGE M3c |
|---|---|---|---|

FIG.2C

SERVICE ISSUING REQUEST (RegisterService_Req)

| REQUEST IDENTIFIER | SESSION ID | SERVICE CODE (SID) | ADDRESS RANGE (AD) | ACCESS ATTRIBUTE (AA) | AUTHENTICATION KEY (K) |
|---|---|---|---|---|---|

SERVICE ISSUING INFORMATION (SID, AD, AA, K)

FIG.2D

SERVICE ISSUING RESPONSE (RegisterService_Res)

| RESPONSE IDENTIFIER | SESSION ID | RESULT CODE (SF) |
|---|---|---|

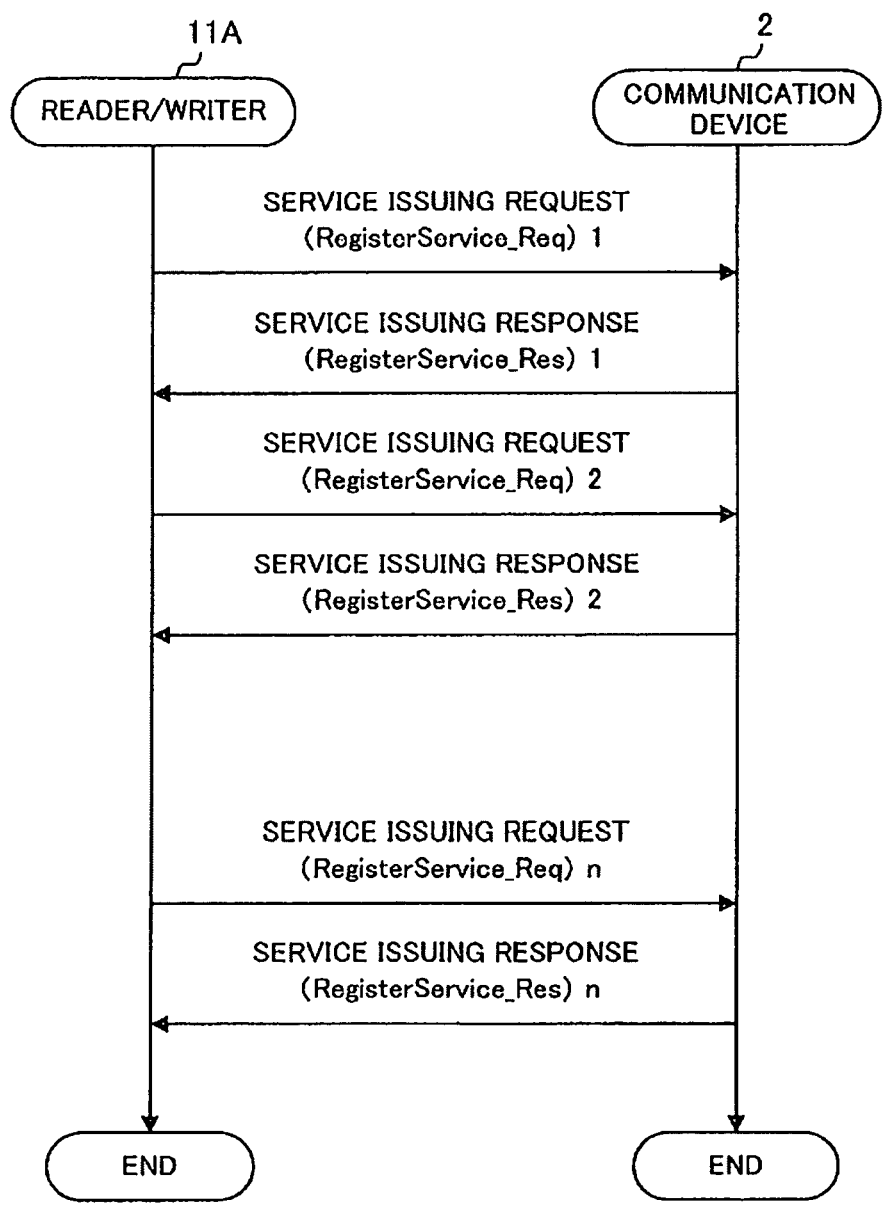

FIG.5A

READOUT REQUEST (Read_Req)

| REQUEST IDENTIFIER | SESSION ID | READOUT TARGET ADDRESS (R_AD) | ACCESS ATTRIBUTE (R_AA) |
|---|---|---|---|

FIG.5B

READOUT RESPONSE (Read_Res)

| RESPONSE IDENTIFIER | SESSION ID | RESULT CODE (SF) | READOUT TARGET DATA (DATA) |
|---|---|---|---|

FIG.5C

WRITE REQUEST (Write_Req)

| REQUEST IDENTIFIER | SESSION ID | WRITE TARGET ADDRESS (R_AD) | ACCESS ATTRIBUTE (R_AA) | WRITE TARGET DATA (DATA) |
|---|---|---|---|---|

FIG.5D

WRITE RESPONSE (Write_Res)

| RESPONSE IDENTIFIER | SESSION ID | RESULT CODE (SF) |
|---|---|---|

FIG.9

| ADDRESS RANGE OF USER DATA | DEFINED ACCESS ATTRIBUTE INFORMATION | | | |
|---|---|---|---|---|
| | PATTERN NUMBER | AUTHENTICATION KEY K1 | AUTHENTICATION KEY K2 | NO AUTHENTICATION KEY |
| —0x10 | PT1 | Read/Write ENABLED | Read/Write ENABLED | Read/Write ENABLED |
| 0x11—0x20 | PT2 | Read/Write ENABLED | Read/Write ENABLED | Read ENABLED |
| 0x21—0x30 | PT3 | Read/Write ENABLED | Read/Write ENABLED | ACCESS DISABLED |
| 0x31—0x40 | PT4 | Read/Write ENABLED | Read ENABLED | ACCESS DISABLED |
| 0x41— | PT5 | Read/Write ENABLED | ACCESS DISABLED | ACCESS DISABLED |

RANGE SET BY USER

RANGE DEFINED (FIXED) BY PRODUCT

SERVICE ISSUING INFORMATION (4Byte): | 0x10 | 0x20 | 0x30 | 0x40 |

COMMUNICATION DEVICE, COMMUNICATION METHOD, COMMUNICATION SYSTEM AND SERVICE ISSUING METHOD

CROSS REFERENCES TO RELATED APPLICATIONS

The present application claims priority to Japanese Priority Patent Application JP 2008-126152 filed in the Japan Patent Office on May 13, 2008, the entire content of which is hereby incorporated by reference.

BACKGROUND

The present application relates to communication devices, communication methods, communication systems, and service issuing methods, in particular, to a communication device for reducing the amount of data to be recorded in the communication device, a communication method, a communication system, and a service issuing method.

Various techniques for issuing an IC (Integrated Circuit) card serving as one example of a communication device or a security device have been disclosed (see e.g., Japanese Patent Application Laid-Open No. 2007-317093). In an application versatile OS in which an IC chip embedded in the communication device is FeliCa (registered trademark), and the loaded OS (Operating System) is FeliCa OS, for example, the issuing of service to the communication device of the related art is carried out by transmitting a plurality of issuing commands from a terminal on the issuing side to the communication device (IC chip), and executing the process with respect to the command in the communication device.

Here, services refer to a range managing the entity of data such as electronic money data itself in a file system of the communication device. For instance, the service corresponds to "file" in Windows (registered trademark). In order to access the data managed in a certain service, a key same as an authentication key assigned, as desired, to the service is prepared on the terminal side making the access.

The issuing of service refers to creating a new service in the file system of the communication device by ensuring a region of a memory for storing user data such as information defining the service and the electronic money data itself, and storing such information in the memory.

When a service issuing command is executed in the communication device, a predetermined access attribute (define type of data structure, method for accessing user data, etc.) defined for every OS and an authentication key used in authentication when accessing are set. One data structure is represented by a combination of such services, thereby realizing a corresponding application. An application refers to a service provided by provider, and includes prepaid electronic money application, credit application, ticket application and the like by way of example.

The communication device can receive the issuing of service corresponding to the application desired to be provided by being placed over a non-contact reader/writer arranged at a predetermined position of a service issuing terminal, or via a communication unit such as being connected to a contact reader/writer with a wired interface.

If the communication device is a function incorporated in a mobile telephone and the like, the service can be issued without using the reader/writer through a method of connecting the IC chip and a controller in the mobile telephone with the wired interface, and inputting a service issuing command to the IC chip via the wired interface. In this case, the service issuing system can be installed at a remote location by transmitting the service issuing command via a mobile telephone network.

[Patent Document I] Japanese Patent Application Laid-Open No. 2007-317093

SUMMARY

However, when issuing (ticketing) access control information with respect to a data block (data storage region) in the communication device which is a security device, the address range of the data block, access attribute, and authentication key are set in units of access control information. Thus, the address range of the data block, the access attribute, the authentication key, and the like are desirably stored in units of access control information with respect to definition information region of a recording unit in the communication device, and thus the necessary amount of storage region increases.

The present application addresses the above-identified, and other issues associated with methods in related art and apparatuses, and it is desirable to provide a new and improved technique capable of reducing the information amount of the service definition information to be held in the recording unit of the communication device which is the security device.

According to an embodiment, there is provided a communication device including a communication unit for transmitting and receiving signals with a service issuing terminal; a recording unit recorded with data, and also recorded with a pattern in which information specifying an authentication key and access attribute indicating whether or not a readout process or a write process on the data is possible using the authentication key are corresponded; and a control unit for, when receiving one or plural information specifying a region of the data from the service issuing terminal via the communication unit, holding the received one or plural information specifying the region of the data.

According to an embodiment described above, a technique capable of reducing the information amount of the service definition information to be held in the recording unit of the communication device which is a security device can be provided.

Additional features and advantages are described herein, and will be apparent from the following Detailed Description and the figures.

BRIEF DESCRIPTION OF THE FIGURES

FIG. 2 is a view showing one example of a command used in a service issuing method of the related art;

FIG. 3 is a view showing one example of service issuing sequence of the related art;

FIG. 5 is a view showing one example of a command used in the data read and write process of the related art;

FIG. 9 is a view showing one example of the service definition information according to the embodiment;

DETAILED DESCRIPTION

Figure 1:
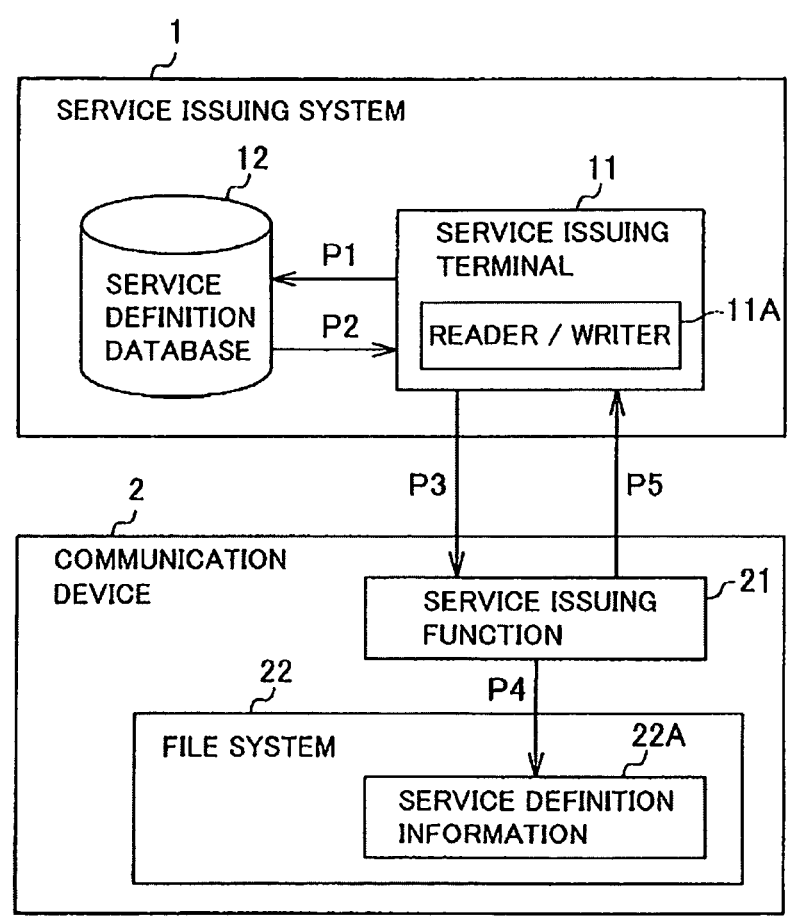
FIG. 1 is a view describing a service issuing method of the related art targeting on a communication device (e.g., IC card) loaded with an application versatile OS.

Hereafter, the present application will be described in detail with reference to the appended drawings according to an embodiment. Note that in this specification and the appended drawings, structural elements that have substantially the same functions and structures are denoted with the same reference numerals and a repeated explanation of these structural elements is omitted.

FIG. 1 is a view describing a service issuing method of the related art targeting on a communication device (e.g., IC card) loaded with an application versatile Os.

As shown in FIG. 1, a service issuing system 1 issues the service. The service issuing system 1 is a system prepared by an application provider, and is configured by a service issuing terminal 11 and a service definition database 12. A reader/writer 11A serving as one example of a communication unit for transmitting/receiving signals with the communication device 2 is arranged at a predetermined position of a housing of the service issuing terminal 11. The service issuing system 1 may be configured by one device, or may be configured by a plurality of devices.

The communication device 2 is a non-contact communication device possessed by the user desiring to be provided with a predetermined application, and a service issuing function 21 and a file system 22 are realized in the communication device 2. The service issuing function 21 is a function realized by executing a predetermined program with the IC chip, and interprets the service issuing command transmitted from the service issuing terminal 11 and issues a service. The file system 22 is a file system for managing data stored in the memory of the IC chip. When receiving the issuing of service, the communication device 2 is placed over the reader/writer 11A of the service issuing terminal 11.

When the communication device 2 is placed over the reader/writer 11A, the service issuing terminal 11 inquires the service definition database 12 the command parameter to add to the service issuing command to issue to the communication device 2 as process P1, as shown in FIG. 1.

When receiving the inquiry from the service issuing terminal 11, the service definition database 12 responds service issuing information specifying the data structure corresponding to the type of service to issue, the method for accessing the user data, and the like as process P2.

When receiving the response from the service definition database 12, the service issuing terminal 11 transmits to the communication device 2 a service issuing request (RegisterService_Req) command added with the service issuing information obtained by inquiring the service definition database 12 as the command parameter as process P3. The transmission of the service issuing command and the command parameter is carried out through the reader/writer 11A (FIG. 2C shows one example of service issuing request command, and FIG. 3 shows one example of service issuing sequence).

When receiving the service issuing command and the command parameter transmitted from the service issuing terminal 11, the service issuing function 21 of the communication device 2 interprets the service issuing command, and executes the internal processing of the communication device as process P4. According to the internal processing of the communication device, the service definition information 22A (see FIG. 4) is generated based on the service issuing information contained in the command parameter transmitted from the service issuing terminal 11 along with the service issuing command. The service issuing function 21 maps the service data structure oh the file system 22 according to the service definition information 22A, thereby performing the issuing of the service.

After the issuing of the service is terminated, the service issuing function 21 transmits to the service issuing terminal 11 the information (result code (SF)) indicating that the issuing of the service is terminated in the parameter of the service issuing response (RegisterService_Res) in process P5.

FIG. 2 is a view showing one example of a command used in the service issuing method of the related art. The command used in the service issuing method of the related art will be described with reference to FIG. 2.

As shown in FIG. 2A, an authentication request (Auth1_Req) is configured to contain a request identifier for identifying the command, a device identifier (IDm) for identifying the communication device, a service code (SID) for identifying the service, an authentication challenge message (M1c), and the like.

FIG. 3 is a view showing one example of the service issuing sequence of the related art. The service issuing sequence of the related art will be described with reference to FIG. 3.

As shown in FIG. 3, in generating the service definition information defining the desired service data structure it may not be realized with one exchange of processes P3 (see FIG. 1) and P5 (see FIG. 1). In that case, the exchange of processes P3 and P5 is repeated plural times.

Figure 4:
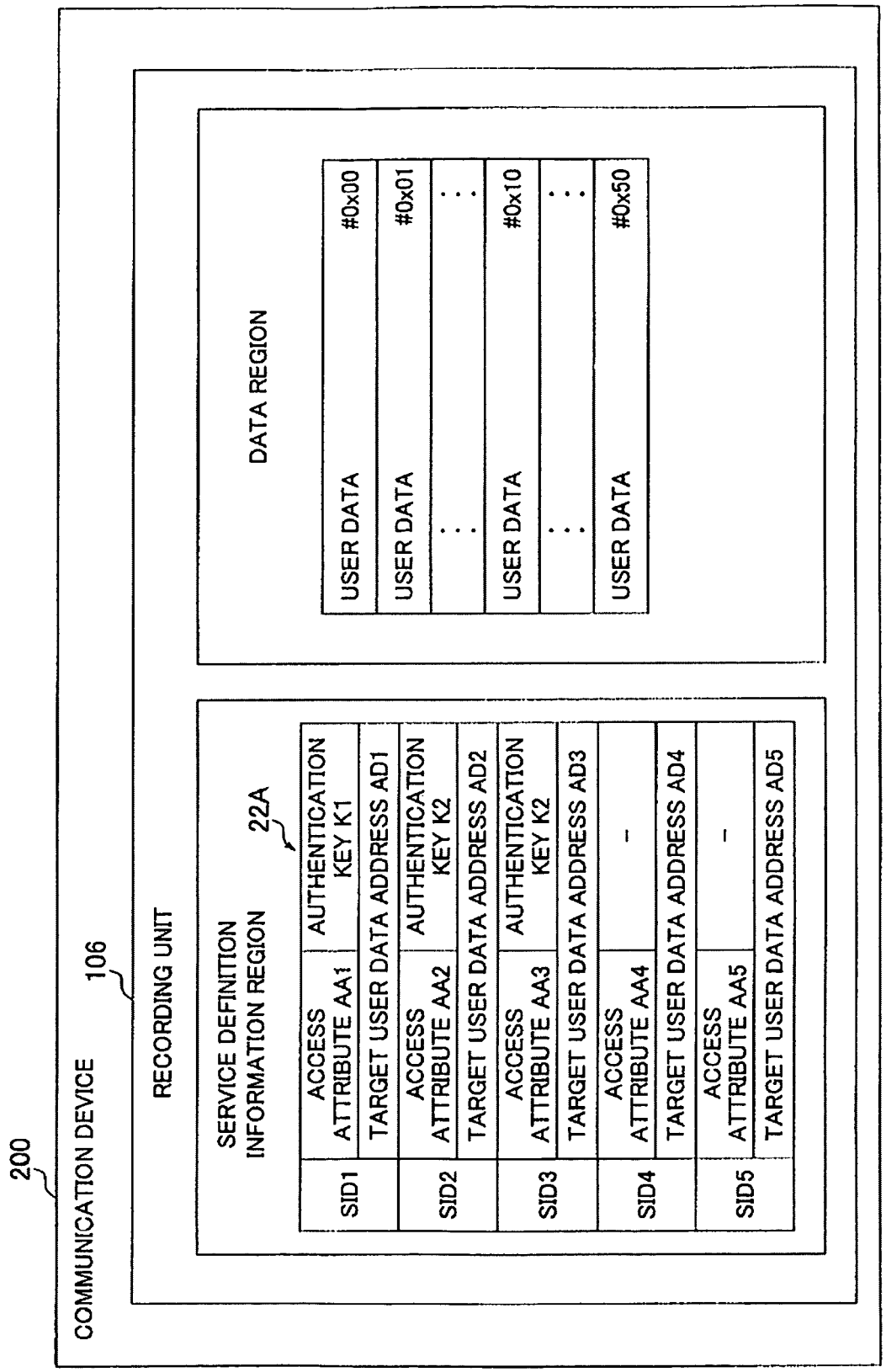
FIG. 4 is a view showing a configuration example of the service definition information and the data of the related art.

FIG. 4 is a view showing a configuration example of the service definition information and the data of the related art. The configuration of the service definition information and the data of the related art will be described with reference to FIG. 4.

More specifically, as shown in FIG. 4, the service definition information 22A is recorded in a recording unit 106 (provided by non-volatile memory etc.) of the communication device 200. As shown in FIG. 4, the recording unit 106 of the communication device 200 is largely divided into the service definition information region and the data region, where the service definition information region is generally defined with a predetermined access attribute defined for every OS and an authentication key used for authentication when making the access. In the example shown in FIG. 4, the service identifier called the service code (SID) is defined for every service units, or five types of SID1 to SID5, and the access attribute (AA1 to AA5), the presence of authentication key (K1, K2) (hyphen "-" when not present), and a target user data address (AD1 to AD5) are stored as a set in the respective service identifier unit.

In operation, when accessing the arbitrary user data address, the corresponding service code (SID) is specified in the parameter, and the authentication command is executed. The authentication process is performed by the authentication key stored in the corresponding service code (SID). After the authentication is completed, control is performed such that execution of the command is permitted according to the access attribute (AA) stored in the corresponding service code (SID) and only when specification to the target user data address (AD) is made using read command, write command, and the like.

In the system of such configuration, a region for storing the access attribute AA, the authentication key K, and the target user data address AD for every service code (SID) is desired in the recording unit of the communication device.

FIG. 5 is a view showing one example of a command used in the data read and write process of the related art. The command used in the data read and write process of the related art will be described with reference to FIG. 5.

As shown in FIG. 5A, the readout request (Read_Req) is configured to contain a request identifier for identifying the command, a session ID for identifying the session, a readout target address (R_AD) indicating the address of the data readout source, an access attribute (R_AA) indicating the access method, and the like.

As shown in FIG. 5B, the readout response (Read_Res) is configured to contain a response identifier for identifying the command, a session ID for identifying the session, a result code (SF) indicating the processing result, readout target data (DATA) which is the read data, and the like.

As shown in FIG. 5C, the write request (Write_Req) is configured to contain a request identifier for identifying the command, a session ID for identifying the session, a write target address (R_AD) indicating the address of data write destination, an access attribute (R_AA) indicating the access method, write target data (DATA) which is data to write, and the like.

As shown in FIG. 5D, the write response (Write_Res) is configured to contain a response identifier for identifying the command, a session ID for identifying the session, a result code (SF) indicating the processing result, and the like.

Figure 6:
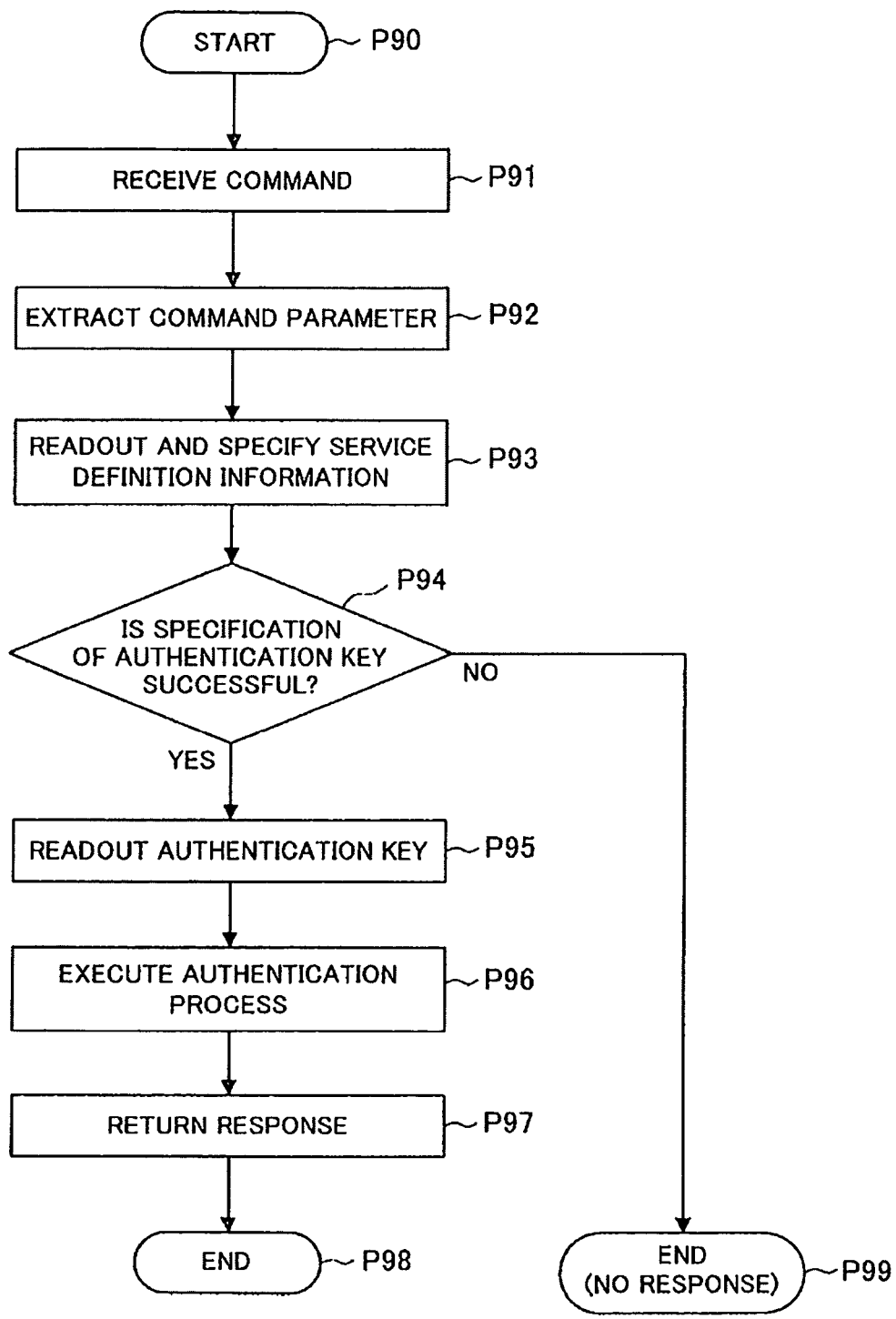
FIG. 6 is a view showing one example of a flowchart showing flow of the authentication process of the related art.

FIG. 6 is a view showing one example of a flowchart showing flow of the authentication process of the related art. The authentication process of the related art will be described with reference to FIG. 6 (see other figures as appropriate).

The authentication process is started by a control unit of the communication device when the authentication request (Auth1_Req) (see FIG. 2A) is transmitted from the reader/writer to the communication device, and is normally terminated when the communication device returns an authentication response (Auth1_Res) (see FIG. 2B).

First, the communication device receives the command (Auth1_Req) in P91. The communication device parses (extracts) the command parameter (device identifier (IDm), service code (SID), authentication challenge message (M1C)) in P92. In P93, the communication device reads out the service definition information held in the recording unit of the communication device, specifies the service definition information corresponding to the service code (SID) obtained in P92, and develops (holds) the content on the RAM. In P94, the communication device specifies the authentication key (K) based on the specified service definition information obtained in P93. If the authentication key is not set, the process proceeds to P99, and the process is terminated with no response without returning the authentication response (Auth_Req). In P95, the communication device reads out the authentication key (K) specified in P94 from the recording unit. In P96, the communication device executes the authentication process using the command parameters obtained in P92 and P95, and the authentication key (K). In P97, the communication device generates a response packet based on the response parameter (authentication challenge message (M2C) and the authentication challenge message (M3C)) obtained in P96, and returns the response packet to the reader/writer.

Figure 7:
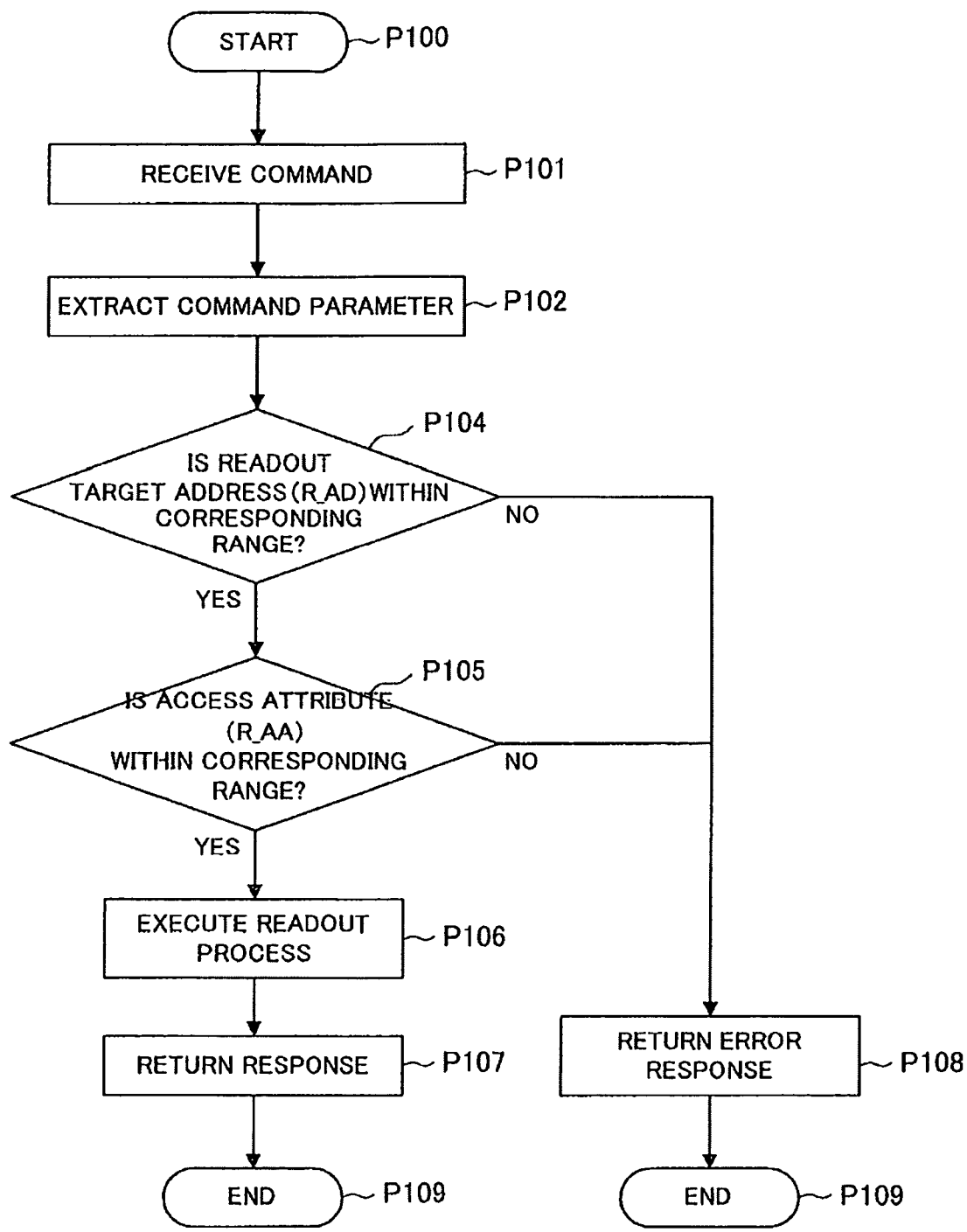
FIG. 7 is a view showing one example of a flowchart showing flow of the data readout process of the related art.

FIG. 7 is a view showing one example of a flowchart showing flow of the data readout process of the related art. The data readout process of the related art will be described with reference to FIG. 7 (see other figures as appropriate).

First, the communication device receives the command (Read_Req) in P10. The communication device parses (extracts) the command parameter (session ID, readout target address (R_AD), access attribute (R_AA)) in P102. In P104, the communication device specifies the target user data address (AD) based on the service definition information specified in the authentication process, and checks if the readout target address (R_AD) is contained. If check is not made, the process proceeds to P108, and the process is terminated by returning an error response. In P105, the communication device specifies the access attribute (AA) based on the service definition information specified in the authentication process, and checks if the access attribute (R_AA) is within a corresponding range. If check is not made, the process proceeds to P108, and the process is terminated by returning an error response. In P106, the communication device executes the readout process using the command parameter obtained in P102. In P107, the communication device generates a response packet based on the response parameter (result code (SF) and readout target data (DATA)) obtained in P106, and returns the response packet to the reader/writer.

Figure 8:
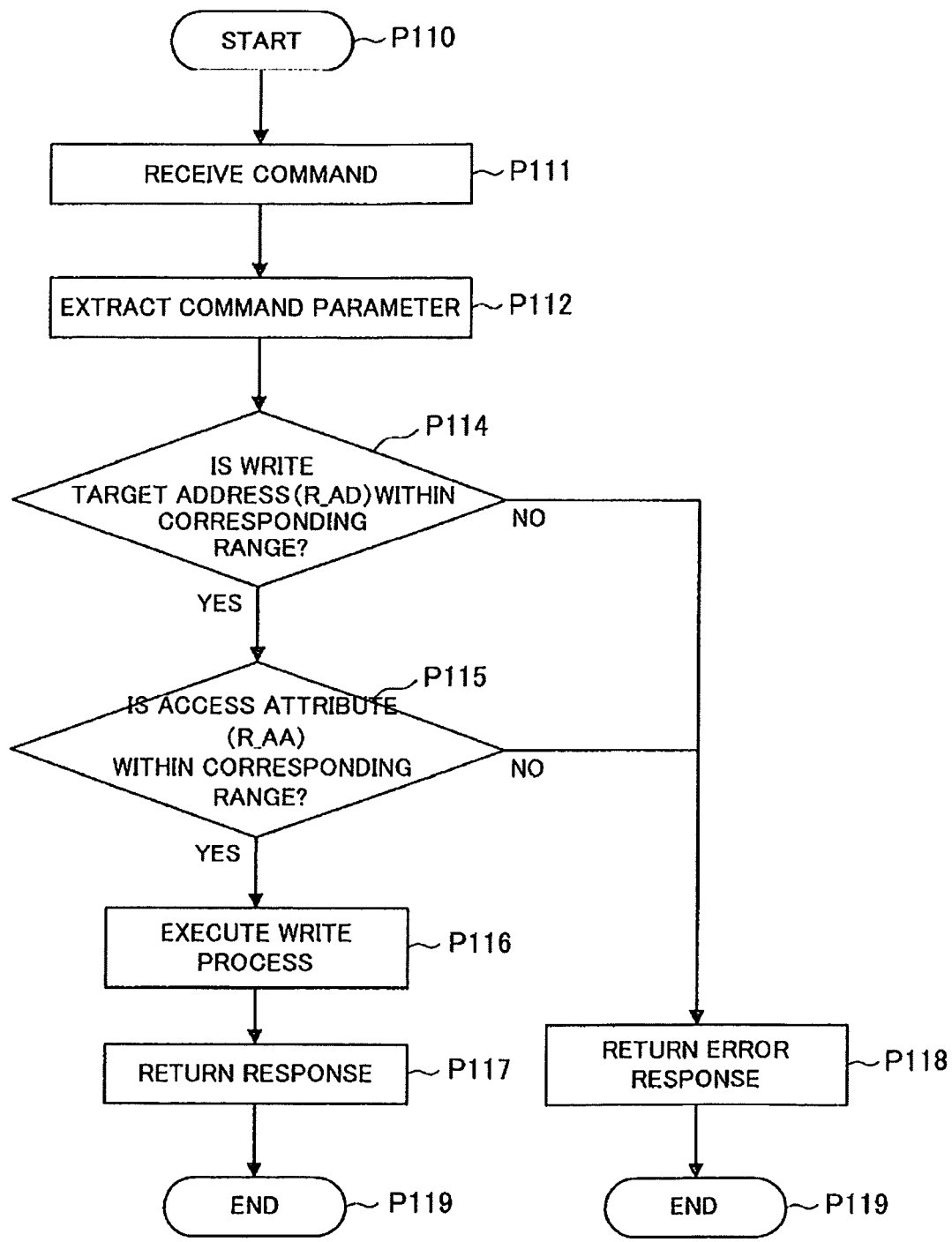
FIG. 8 is a view showing one example of a flowchart showing flow of data write process of the related art.

FIG. 8 is a view showing one example of a flowchart showing flow of data write process of the related art. The data write process of the related art will be described with reference to FIG. 8 (see other figures as appropriately).

First, the communication device receives the command (Write_Req) in P111. The communication device parses (extracts) the command parameter (session ID, write target address (R_AD), access attribute (R_AA), write target data (DATA)) in P112. In P114, the communication device specifies the target user address (AD) based on the service definition information specified in the authentication process, and checks if the write target address (R_AD) is contained. If check is not made, the process proceeds to P118, and the process is terminated by returning an error response. In P115, the communication device specifies the access attribute (AA) based on the service definition information specified in the authentication process, and checks if the access attribute (R_AA) is within a corresponding range. If check is not made, the process proceeds to P118, and the process is terminated by returning an error response. In P116, the communication device executes the write process using the command parameter obtained in P112. In P117, the communication device generates a response packet based on the response parameter (result code (SF)) obtained in P116, and returns the response packet to the reader/writer.

FIG. 9 is a view showing one example of the service definition information according to an embodiment. One example of the service definition information according to an embodiment will be described with reference to FIG. 9.

A service issuing information table describes the data structure to store in the service definition information 220A.

One example of the service issuing information table is shown, where five types of access attribute value patterns indicated with the term of the pattern number are defined.

Pattern PT1 shows the access attribute that is Read/Write enabled irrespective of the presence of authentication.

Pattern PT2 shows the access attribute that is Read/Write enabled after the authentication using the authentication key K1/K2, or only Read is enabled if authentication is not made.

Pattern PT3 shows the access attribute that is Read/Write enabled after the authentication using the authentication key K1/K2, but access is disabled if authentication is not made.

Pattern PT4 shows the access attribute that is Read/Write enabled after the authentication using the authentication key K1, only Read is enabled after the authentication using the authentication key K2, and access is disabled if authentication is not made.

Pattern PT5 shows the access attribute that is Read/write enabled only after the authentication using the authentication key K1, but access is disabled in other cases.

The correspondence of the pattern number and the access attribute, and the order of the pattern number are specifications fixed according to the communication device product, and mounting is implemented such that interpretation complying with the specification is made by the control unit.

As shown in FIG. 9, the (defined) access attribute information is configured by a combination in which information specifying the authentication key and information (pattern) indicating whether or not the readout process or the write process on the data region is possible using such authentication key are corresponded. Such combination may be of any number as long as it is one or more. As shown in FIG. 9, the pattern number may be assigned to each combination. Such access attribute information is recorded in the recording unit 106 (see FIG. 12) of the communication device 200.

Figure 10:
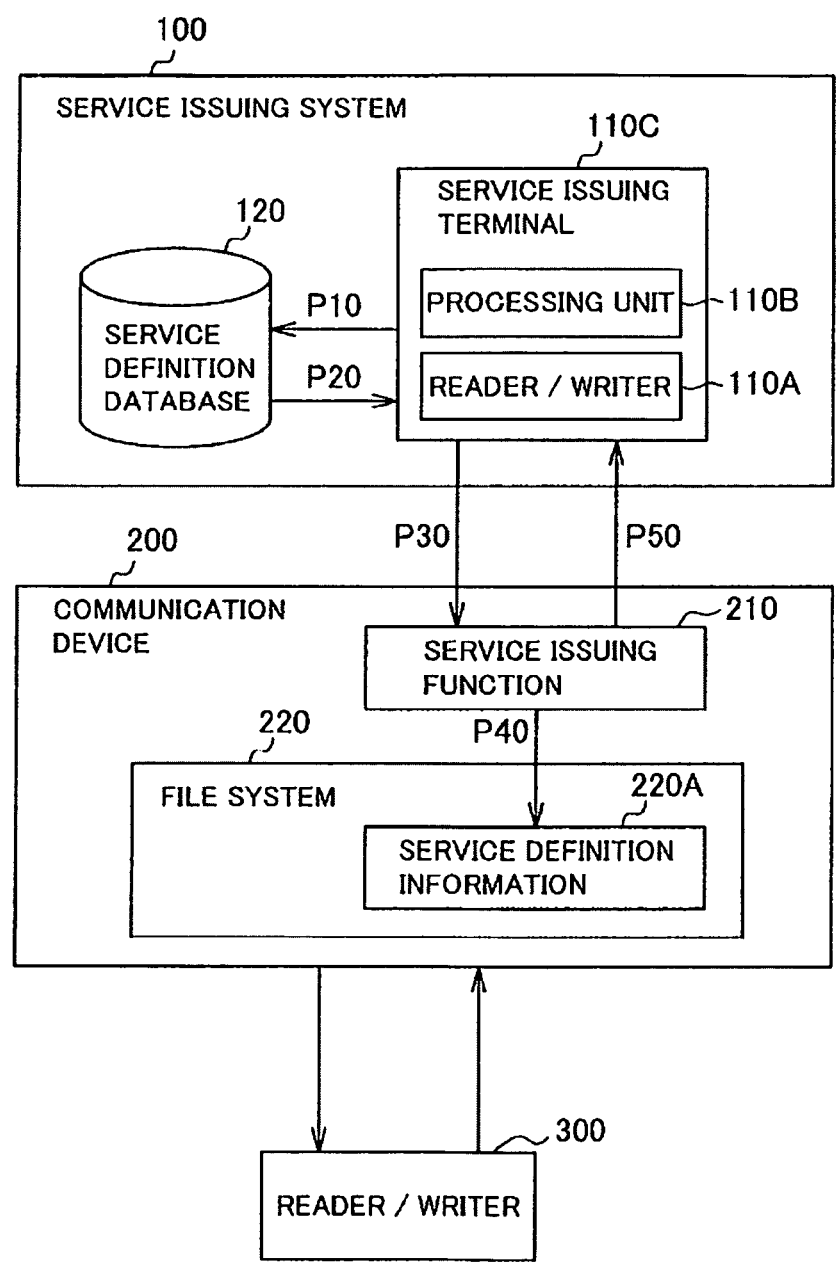
FIG. 10 is a view showing one example of a system according to the embodiment.

FIG. 10 is a view showing one example of a system according to the embodiment of the present application. One example of the system according to the embodiment of the present application will be described with reference to FIG. 10.

As shown in FIG. 10, the service issuing system 100 issues the service. The service issuing system 100 is a system prepared by the application provider, and the like, and is configured by a service issuing terminal 110C and a service definition database 120. A reader/writer 110A serving as one example of a communication unit for transmitting/receiving signals with the communication device 200 is arranged at a predetermined position of a housing of the service issuing terminal 110C. The service issuing terminal 110C includes a processing unit 110B for performing control of the reader/writer 110A, and control processing of the interior of the service issuing terminal 110C. The processing unit 110B is configured by a CPU (Central Processing Unit), and the like, and its function is realized by executing a program stored in a memory (not shown). The service issuing system 100 may be configured by one device, or may be configured by a plurality of devices.

The communication device 200 is a non-contact communication device possessed by the user desiring to be provided with a predetermined application, and a service issuing function 210 and a file system 220 are realized in the communication device 200. The service issuing function 210 is a function realized by executing a predetermined program with the IC chip, and interprets the service issuing command transmitted from the service issuing terminal 110C and issues a service. The service issuing function 210 is part of the function of the control unit 104 shown in FIG. 11. The file system 220 is a file system for managing data stored in the memory of the IC chip. When receiving the issuing of service, the communication device 200 is placed over the reader/writer 10A of the service issuing terminal 110C.

When the communication device 200 is placed over the reader/writer 110A, the processing unit 110B of the service issuing terminal 110C inquires the service definition database 120 the command parameter to add to the service issuing command to issue to the communication device 200 as process P10, as shown in FIG. 10.

When receiving the inquiry from the service issuing terminal 110C, the service definition database 120 responds service issuing information as process P20. The service issuing information here is configured by a combination of the information specifying the region of the data recorded in the recording unit 106 of the communication device 200 and the pattern number. The information specifying the region of the data is configured with a start address indicating the start position of the region of the data and an end address indicating the end position of the region of the data corresponded to each other. The number of combinations of the information specifying the region of the data and the pattern number may be any number as long as it is one or more.

The service issuing information may not contain the pattern number. Furthermore, if data is continuously recorded in the recording unit 106 of the communication device 200, the information specifying the region of the data may not contain the start address indicating the start position of the region of the data. That is, the information specifying the region of the data merely contains the end address indicating the end position of the region of the data.

When receiving the response from the service definition database 120, the service issuing terminal 110C transmits to the communication device 200 a service issuing request (RegisterService_Req) command added with the service issuing information obtained by inquiring the service definition database 120 as the command parameter as process P30. The transmission of the service issuing command and the command parameter is carried out through the reader/writer 110A.

When receiving the service issuing command and the command parameter transmitted from the service issuing terminal 110C, the service issuing function 210 of the communication device 200 interprets the service issuing command, and executes the internal processing of the communication device as process P40. According to the internal processing of the communication device, the service issuing information contained in the command parameter transmitted from the service issuing terminal 110C along with the service issuing command is recorded in the recording unit 106 managed by the control unit 104 of the communication device 200.

After the issuing of the service is terminated, the service issuing function 210 transmits to the service issuing terminal 110C the information (result code (SF)) indicating that the issuing of the service is terminated in the parameter of the service issuing response (RegisterService_Res) in process P50.

Therefore, the user of the communication device 200 (communication device issuer) assigns the address range of the user data with respect to the pattern number according to the usage application. Therefore, the service issuing information is determined by determining the address range of the user data. The order of pattern number is such that it is lined in the same order as the address value of the user data, and thus the service issuing information to be held in the service definition information region of the communication device may only be a boundary value of the address range of the user data, or a total of four bytes in this example. In the service issuing request (RegisterService_Req) shown in FIG. 2C, the service issuing information excluding the authentication key (K) can be omitted up to four bytes.

Furthermore, with regards to the processing logic, in the authentication request (Auth_Req) command, the process of specifying the authentication key (K) from the service code (SID) using the service definition information performed in P93 can be omitted. In the Read/Write command, the check of the target user data address (AD) and the check of the access attribute (AA) maybe omitted using the service definition information performed in P104, P105/P114, P115 and thus the high speed processing is realized in the same use case.

Figure 11:
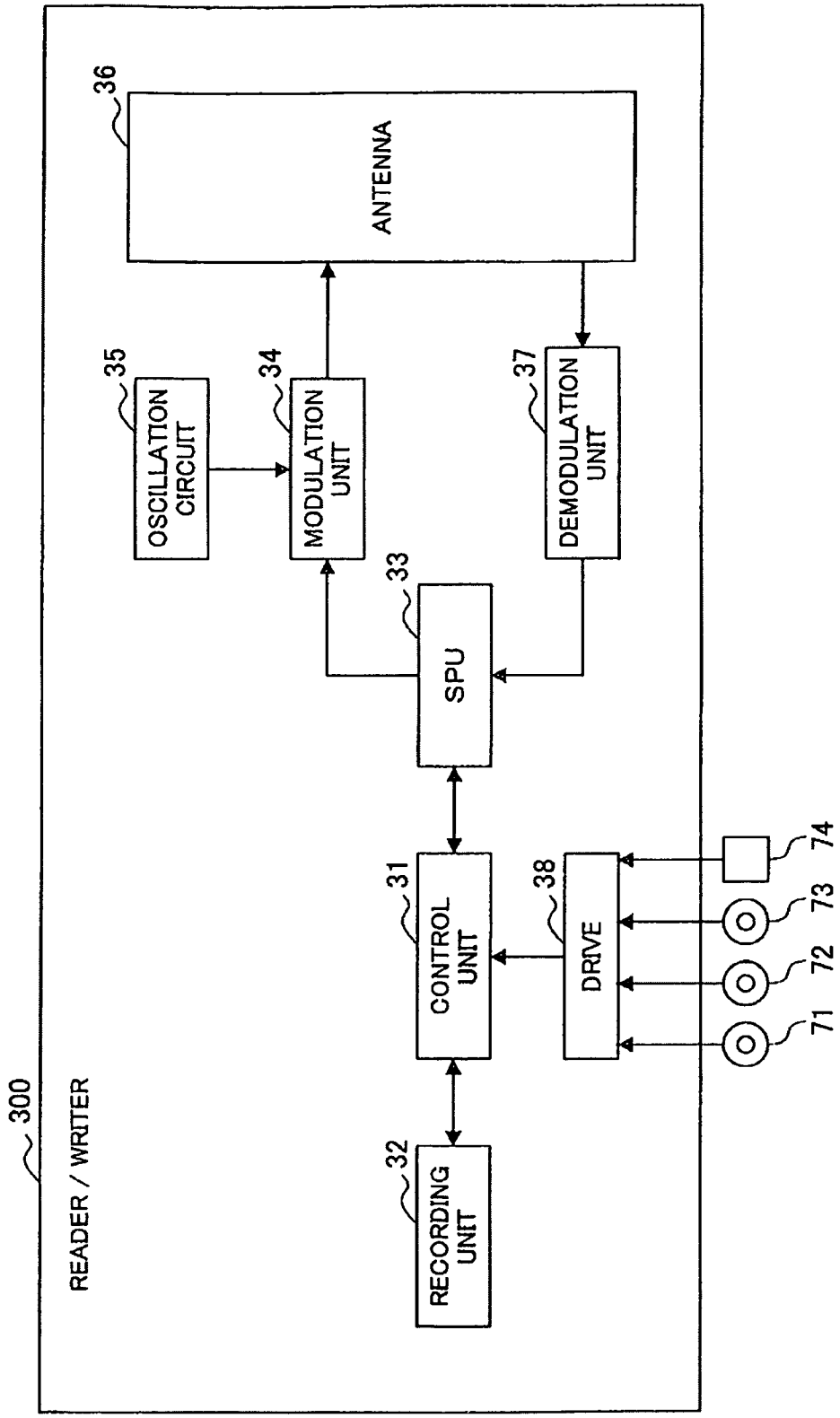
FIG. 11 is a block diagram showing a configuration of the function of the reader/writer according to the embodiment.

FIG. 11 is a block diagram showing a configuration of the function of the reader/writer according to the embodiment. The reader/writer according to the embodiment will be described with reference to FIG. 11.

The reader/writer 300 is configured to include a control unit 31, a recording unit 32, a SPU (Signal Processing Unit) 33, a modulation unit 34, an oscillation circuit 35, an antenna 36 serving as one example of a communication unit, a demodulation unit 37, and a drive 38.

The control unit 31 generates a request signal requesting for overwrite of data containing predetermined data. The control unit 31 also generates a request signal requesting for transmission of the predetermined data.

The control unit 31 generates data to stored in the request signal requesting for overwrite of the data. For example, the control unit 31 is configured by a CPU (Central Processing Unit) and the like, and reads the program provided from the driver 38, which is attached as desired, and executes the read program. If programs and data are provided from the drive 38, the control unit 31 provides the provided programs and data to the recording unit 32, as desired, reads the program recorded in the recording unit 32, and executes the read program. The control unit 31 incorporates a memory so that data can be held therein.

The recording unit 32 is a so-called non-volatile storage medium or recording medium that is rewritable and that can hold the recorded content even if the power is cut off, and for example, is configured by a hard disc, flash memory, or the like. The recording unit 32 records various data. The recording unit 32 provides the recorded data to the control unit 31 as desired.

The recording unit 32 provides the recorded authentication key to the control unit 31. The recording unit 32 also records data provided from the control unit 31.

The SPU 33 codes the request signal provided from the control unit 31 through a predetermined method, and provides the coded request signal to the modulation unit 34. The SPU 33 decodes a response signal provided from the demodulation unit 37 through a method corresponding to the coding method of the response signal, and provides the decoded response signal to the control unit 31.

For example, when the request signal to be transmitted for the communication device 200 is provided from the control unit 31, the SPU 33 performs a coding process such as coding to a Manchester code on the relevant request signal, and outputs the obtained signal to the modulation unit 34. When the response signal from the communication device 200 is provided from the demodulation unit 37, the SPU 33 performs a decoding process such as decoding of the Manchester code on the relevant data, and provides the obtained signal to the control unit 31.

The modulation unit 34 generates a carrier wave based on the clock signal of a predetermined frequency provided from the oscillation circuit 35. The modulation unit 34 modulates the request signal provided from the SPU 33 through the predetermined method based on the carrier wave to generate a request signal, and provides the modulated request signal to the antenna 36. For instance, the modulation unit 34 generates a modulated request signal by changing the phase, amplitude, frequency, and the like of the carrier wave based on the request signal provided from the SPU 33.

More specifically, the modulation unit 34 ASK (Amplitude Shift Keying) modulates the data provided by the SPU 33 with the clock signal having a frequency of 13.56 MHz provided from the oscillation circuit 35 as the carrier wave, and outputs the generated modulation wave to the antenna 36 as electromagnetic wave.

The oscillation circuit 35 generates the clock signal of a predetermined frequency that becomes a reference, and provides the generated clock signal to the modulation unit 34.

The antenna 36 transmits the request signal provided from the modulation unit 34 to the communication device 200 by wireless communication. In other words, the antenna 36 radiates electric wave for transmitting the request signal provided from the modulation unit 34. The antenna 36 receives the response signal transmitted from the communication device 200, and provides the received response signal to the demodulation unit 37.

The demodulation unit 37 demodulates the response signal provided from the antenna 36 through a demodulation method corresponding to the modulation method of the modulation unit 109 (see FIG. 3), and provides the demodulated response signal to the SPU 33. For instance, the demodulation unit 37 demodulates the modulation wave (ASK modulation wave) acquired through the antenna 36, and outputs the demodulated response signal to the SPU 33.

When a magnetic disc 71, an optical disc 72, a magneto-optical disc 73, or a semiconductor memory 74 is attached, the drive 38 drives the same to acquire the recorded program, data and the like. The acquired program and data are transferred to the control unit 31 or the communication device 200. The program transferred (transmitted) to the communication device 200 is recorded or executed, as necessary, by the communication device 200.

Figure 12:
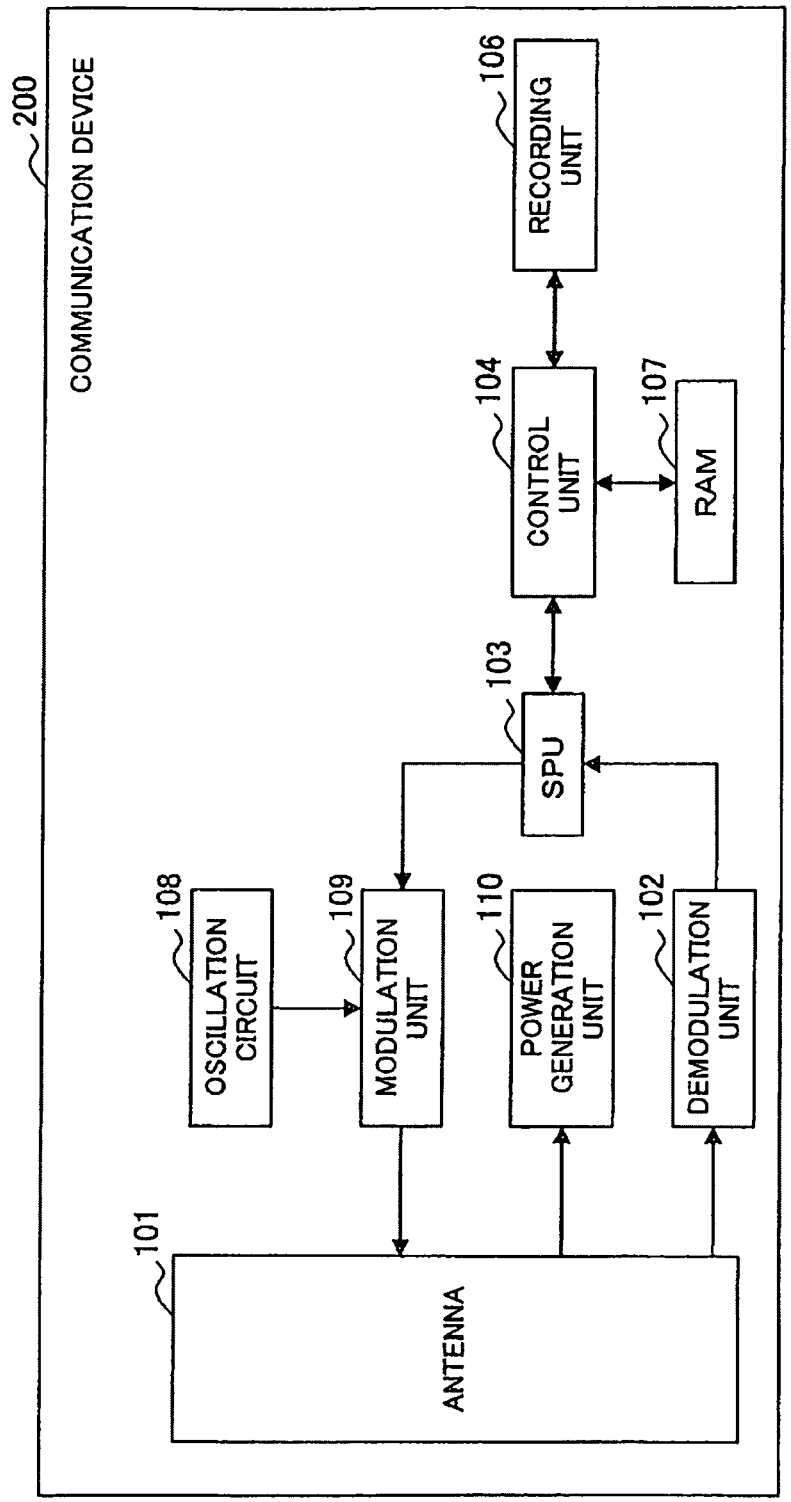
FIG. 12 is a block diagram showing a configuration of the function of the communication device according to the embodiment.

FIG. 12 is a block diagram showing a configuration of a function of the communication device according to the present embodiment. The communication device according to the embodiment will be described with reference to FIG. 12.

The communication device 200 is configured to include an antenna 101 serving as one example of a communication unit, a demodulation unit 102, a SPU 103, a control unit 104, a recording unit 106, a RAM (Random Access Memory) 107, an oscillation circuit 108, a modulation unit 109, and a power generation unit 110.

The antenna 101 receives the request signal transmitted from the reader/writer 300, and provides the received request signal to the demodulation unit 102. The antenna 101 transmits the response signal provided from the modulation unit 109 to the reader/writer 300 by wireless communication. In other words, the antenna 101 radiates the electric wave for transmitting the response signal provided from the modulation unit 109. At the antenna 101, resonance occurs by the electric wave of a predetermined frequency radiated from the reader/writer 300, thereby generating electromotive force.

The demodulation unit 102 demodulates the request signal provided from the antenna 101 through a demodulation method corresponding to the modulation method of the modulation unit 34 (see FIG. 11), and provides the demodulated request signal to the SPU 103. For instance, the demodulation unit 102 envelope detects the request signal or the ASK modulation wave received via the antenna 101 and demodulates the same, and outputs the demodulated request signal to the SPU 103.

The SPU 103 decodes the request signal provided from the demodulation unit 102 through a predetermined method, and provides the decoded request signal to the control unit 104. The SPU 103 codes the response signal provided from the control unit 104 through a predetermined coding method, and provides the coded response signal to the modulation unit 109. For instance, if the data demodulated in the demodulation unit 102 is coded through the Manchester method, the SPU 103 decodes the data (decode the Manchester code) based on the clock signal provided from a PLL (Phase Locked Loop) circuit (not shown), and provides the decoded data to the control unit 104. For instance, the SPU 103 codes the response signal provided from the control unit 104 through the Manchester method, and provides the coded response signal to the modulation unit 109.

The control unit 104 is configured by a CPU (Central Processing Unit), and the like, and its function is realized by executing a program stored in the RAM 107.

The recording unit 106 is configured by a non-volatile memory such as flash memory, EEPROM, MRAM, FeRAM or the like. The recording unit 106 records various data such as confidential data to be transmitted to the reader/writer 300 and data necessary for the execution of the program.

The RAM 107 appropriately stores data necessary for the execution of the program, and the like. The RAM 107 provides the stored data to the control unit 104.

The oscillation circuit 108 generates the clock signal having a frequency same as the frequency of the request signal received by the antenna 101, and provides the generated clock signal to the modulation unit 109. The oscillation circuit 108 incorporates a PLL circuit, and generates a clock signal having the same frequency as the clock frequency of the request signal.

The modulation unit 109 generates a carrier wave based on the clock signal of a predetermined frequency provided from the oscillation circuit 108. The modulation unit 109 modulates the response signal provided from the SPU 103 through a predetermined method based on the carrier wave to generate the response signal, and provides the modulated response signal to the antenna 101. For instance, the modulation unit 109 further ASK modulates the response signal coded through the Manchester method provided from the SPU 103, and transmits the modulated response signal to the reader/writer 300 via the antenna 101.

The modulation unit 109 turns ON/OFF a predetermined switching element (not shown) with respect to the response signal provided from the SPU 103, and connects a predetermined load in parallel to the antenna 101 only when the switching element is in the ON state to fluctuate the load of the antenna 101. The ASK modulated response signal is transmitted to the reader/writer 300 via the antenna 101 by the fluctuation of the load of the antenna 101 (fluctuate terminal voltage of the antenna 36 of the reader/writer 300).

The power generation unit 110 generates a direct current (DC) power based on the alternating current (AC) electromotive force generated at the antenna 101, and supplies the generated DC power to each unit of the communication device 200.

As described above, in the present embodiment, when issuing (ticketing) the access control information with respect to the data block in the communication device (e.g., IC card) which is a security device for securely storing information, instead of storing the address range of the data block, the access attribute, the authentication key, and the like in units of access control information with respect to the recording unit, use is made in assigning to the pattern represented by a combination of the access attribute value and the authentication key defined for every product in accordance with the usage application in advance.

For the operation processing logic, the readout of the service definition information from the recording unit, the specification of the authentication key, the specification and checking of the access attribute value, and the specification and checking of the address range may not be performed by using the pattern defined for every product. Therefore, reading and searching processing of the service issuing information in the recording unit can be omitted. Furthermore, in the issuing process, only the address boundary value of the data block may be specified together instead of transmitting by a command for every unit of access control information. Therefore, as the service issuing (ticketing) is completed with shorter command parameter and fewer command/response number of times, the service issuing of higher speed is realized. Accordingly, the issuing/operation processing process is simplified, and the processing is completed at higher speed in the same use case.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A communication device comprising:
   a communication unit for transmitting and receiving signals with a service issuing terminal;
   a recording unit recorded with data and a plurality of patterns, including a first pattern and a second pattern different from the first pattern, the first pattern specifying at least two authentication keys including a first authentication key and a second authentication key, and the second pattern specifying at least two authentication keys including the first authentication key and the second authentication key, each of the first authentication key and the second authentication key corresponding to an access attribute indicating whether or not a readout process or a write process on the data is possible using the respective authentication key; and
   a control unit for, when receiving one or plural information specifying a region of the data from the service issuing terminal via the communication unit, holding the received one or plural information specifying the region of the data.

2. The communication device according to claim 1, wherein the control unit receives information in which a start address indicating a start position of the region of the data and an end address indicating an end position of the region of the data are corresponded as the information specifying the region of the data.

3. The communication device according to claim 1, wherein the recording unit is continuously recorded with the data; and
   the control unit receives an end address indicating the end position of the region of the data as the information specifying the region of the data.

4. The communication device according to claim 1, wherein the plurality of patterns include:
   (a) a first pattern specifying the first authentication key corresponding to a first access attribute indicating that both the readout process and the write process are possible using the first authentication key; and
   (b) a second pattern specifying the first authentication key corresponding to a second access attribute indicating that none or one of the readout process and the write process are possible using the first authentication key.

5. A communication device comprising:
   a communication unit for transmitting and receiving signals with a service issuing terminal;
   a recording unit recorded with data and a plurality of patterns, including a first pattern and a second pattern different from the first pattern, the first pattern specifying at least two authentication keys including a first authentication key and a second authentication key, and the second pattern specifying at least two authentication keys including the first authentication key and the second authentication key, each of the first authentication key and the second authentication key corresponding to an access attribute indicating whether or not a readout process or a write process on the data is possible using the respective authentication key, wherein the recording unit is also recorded with a plurality of pattern numbers, each pattern number specifying one of the plurality of patterns; and a control unit for, when receiving one or plural combination of information specifying a region of the data and at least one pattern number from the service issuing terminal via the communication unit, holding the received one or plural combination.

6. A communication method executed by a control unit of a communication device including a recording unit recorded with data and a plurality of patterns, including a first pattern and a second pattern different from the first pattern, the first pattern specifying at least two authentication keys including a first authentication key and a second authentication key, and the second pattern specifying at least two authentication keys including the first authentication key and the second authentication key, each of the first authentication key and the second authentication key corresponding to an access attribute indicating whether or not a readout process or a write process on the data is possible using the respective authentication key, the method comprising the steps of:

receiving one or plural information specifying a region of the data from a service issuing terminal via a communication unit for transmitting and receiving signals with the service issuing terminal; and holding the received one or plural information specifying the region of the data.

7. A communication system comprising:

a communication device including, a communication unit for transmitting and receiving signals with a service issuing terminal, a recording unit recorded with data and a plurality of patterns, including a first pattern and a second pattern different from the first pattern, the first pattern specifying at least two authentication keys including a first authentication key and a second authentication key, and the second pattern specifying at least two authentication keys including the first authentication key and the second authentication key, each of the first authentication key and the second authentication key corresponding to an access attribute indicating whether or not a readout process or a write process on the data is possible using the respective authentication key, and a control unit for, when receiving one or plural information specifying a region of the data from the service issuing terminal via the communication unit, holding the received one or plural information specifying the region of the data; and a service issuing terminal including, a communication unit for transmitting and receiving signals with the communication device, and a processing unit for transmitting one or plural information specifying the region of the data recorded in the recording unit of the communication device via the communication unit.

8. A service issuing method by a communication system comprising a communication device including a communication unit for transmitting and receiving signals with a service issuing terminal, and a recording unit recorded with data and a plurality of patterns, including a first pattern and a second pattern from the first pattern, the first pattern specifying at least two authentication keys including a first authentication key and a second authentication key, and the second pattern specifying at least two authentication keys including the first authentication key and the second authentication key, each of the first authentication key and the second authentication key corresponding to an access attribute indicating whether or not a readout process or a write process on the data is possible using the respective authentication key; and the service issuing terminal including a communication unit for transmitting and receiving signals with the communication device, wherein a processing unit of the service issuing terminal executes the step of:

transmitting one or plural information specifying a region of the data recorded in the recording unit of the communication device via the communication unit; and a control unit of the communication device executes the steps of:

receiving the one or plural information specifying the region of the data from the service issuing terminal via the communication unit; and holding the received one or plural information specifying the region of the data.

* * * * *